United States Patent Office 2,895,886
Patented July 21, 1959

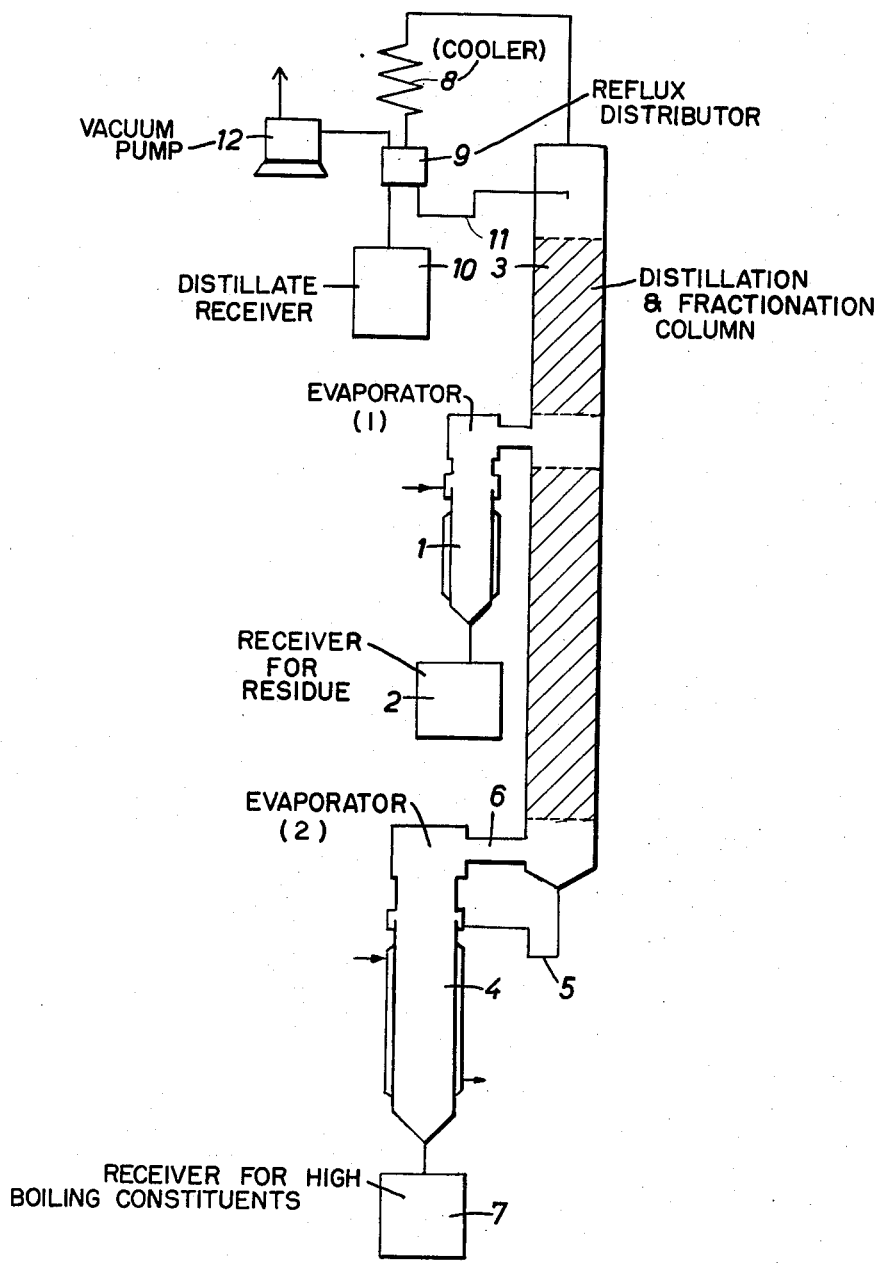

2,895,886
DISTILLATION APPARATUS

Rudolf Schneider, Krefeld-Uerdingen, Germany, assignor to Farbenfabriken Bayer Aktiengesellschaft, Leverkusen, Germany, a corporation of Germany Application April 8, 1953, Serial No. 347,481

Claims priority, application Germany April 24, 1952

2 Claims. (Cl. 202—158)

The present invention relates to distillation apparatus.

It is known to use circulation evaporators for distillation columns, preferably continuously working columns. The content of the evaporators, especially in the distillation of materials sensitive to high temperatures, should be as small as possible in order to reduce the time the product is in the evaporator and to prevent the decomposition of the product caused by the heating process required. This precaution, however, is frequently insufficient to ensure that the process is economic as regards losses of material due to decomposition at the boiling temperature of the evaporator, since the liquid is very intensely rotated in the circulation evaporator so that there are practically no marked differences in concentration between the upper section, where the vapor escapes, and the lower section of the evaporator. The liquid must, therefore, be evaporated at the high concentration of the effluent and accordingly at high evaporation temperature.

According to the present invention those disadvantages are eliminated by the use, with a distillation column, of at least one evaporator in which liquid is evaporated in a thin layer. Such an evaporator is distinguished from a circulation evaporator by the gentle and careful evaporation due to shorter duration of evaporation time. The shortening of the evaporation time may be alleged to be within the skill of the art; however, the operational content of the column, which is many times that of such an evaporator, is inconsistent with such prediction, and it is a surprising feature, that such an evaporator (the duration of evaporation in which is, as compared with the usual columns, for instance Raschig ring columns, many times shorter), cannot only be used as the evaporator of such distillation columns, but even offers considerable advantages, especially in the distillation of materials which are sensitive to higher temperatures. This is so, since such an evaporator can be positioned in the column where the danger of decomposition of the products is greatest, for instance at the lower part of the column because of the prevailing higher concentration of high boiling constituents there. Furthermore, in contrast to circulation evaporators, evaporation occurs at lower concentrations since the discharge concentration and the highest temperature is reached only at the end of such a film evaporator. Due to the lower concentration, decomposition of the product during evaporation occurs to a lesser degree. The vapor moving upwards from such an evaporator has a lower concentration than in the case of a circulation evaporator; accordingly, the required height of column becomes smaller at the lower end of the column where the danger of decomposition is greatest.

The invention is illustrated by way of example in the accompanying diagrammatic drawing which shows an arrangement for separation into a residue and two fractions. The crude product is evaporated in a thin layer in an evaporator 1 and liberated from the residue which runs into a receiver 2. The vapors issue from the evaporator 1 into a column 3. At the bottom of the column 3 is a second evaporator 4 (of the same type as the evaporator 1) into which the reflux runs over a siphon 5 and the vapors of which are returned to the column 3 through a pipe 6. The high boiling constituents separated from the low boiling fraction are collected in a receiver 7. The low boiling vapors fractionated in the column 3 are condensed in a cooler 8 and separated with the aid of the reflux distributor 9 into the distillate, which is collected in a receiver 10, and into the residue which is returned to the column 3 over a siphon 11. A vacuum pump 12 is connected to the reflux distributor and the receiver.

The known constructions, for instance free-fall evaporators with rotating plates of evaporators in which liquid is evaporated in thin layers running down the wall where the liquid is distributed by wipers or brushes, can be used as evaporators.

I claim:

1. A distillation apparatus comprising a distillation column and a film evaporator connected to said distillation column for receiving reflux from the lower end portion of said distillation column into its upper end portion and for passing vapor from its upper end portion upwardly to the lower end portion of said distillation column, said film evaporator having a vertically extending evaporator surface.

2. A distillation apparatus according to claim 1 in which said thin film evaporator has a cylindrical evaporation surface.

References Cited in the file of this patent
UNITED STATES PATENTS

| | | |
|---|---|---|
| 1,395,577 | Jensen | Nov. 1, 1921 |
| 1,837,834 | Peters | Dec. 22, 1931 |
| 1,892,652 | Heath | Dec. 27, 1932 |
| 1,953,730 | Stratford | Apr. 3, 1934 |
| 2,235,127 | Tyson | Mar. 18, 1941 |
| 2,266,941 | Van de Griendt | Dec. 23, 1941 |
| 2,447,746 | Ferris et al. | Aug. 24, 1948 |
| 2,491,732 | Hawkinson et al. | Dec. 20, 1949 |

FOREIGN PATENTS

| | | |
|---|---|---|
| 372,240 | Germany | Mar. 23, 1923 |

OTHER REFERENCES

Carpenter et al.: "Continuous Fractionating Columns for Pilot Plants," Ind. and Eng. Chemistry, vol 42, Issue No. 3, March 1950.